United States Patent
Xu

(10) Patent No.: US 10,789,795 B1
(45) Date of Patent: *Sep. 29, 2020

(54) TRAFFIC DETECTION METHOD, DEVICE, AND SYSTEM

(71) Applicant: Alibaba Group Holding Limited, George Town (KY)

(72) Inventor: Wenhai Xu, Shanghai (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,213

(22) Filed: May 22, 2020

Related U.S. Application Data

(63) Continuation of application No. 16/235,653, filed on Dec. 28, 2018, now Pat. No. 10,685,519.

(30) Foreign Application Priority Data

Dec. 29, 2017 (CN) .......................... 2017 1 1479122

(51) Int. Cl.
*G07C 9/25* (2020.01)
*G06Q 20/32* (2012.01)
(Continued)

(52) U.S. Cl.
CPC ......... *G07C 9/253* (2020.01); *G06K 9/00255* (2013.01); *G06K 9/00288* (2013.01);
(Continued)

(58) Field of Classification Search
CPC ............... G07B 15/04; G06Q 20/3278; G06Q 20/40145; G07C 2209/02; G07C 9/28
(Continued)

(56) References Cited

U.S. PATENT DOCUMENTS 6,698,653 B1   3/2004 Diamond et al.
7,183,895 B2   2/2007 Bazakos et al.
(Continued)

FOREIGN PATENT DOCUMENTS

CN   201035635   3/2008
CN   101245688   8/2008
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Vernal U Brown
(74) *Attorney, Agent, or Firm* — Fish & Richardson P.C.

(57) ABSTRACT

A wireless access device deployed at a traffic station performs short-range wireless communication with a mobile device associated with a target user and entering a signal coverage area of the traffic station. An association between identity information of the target user and the traffic station is detected. An image capture device deployed at the traffic station obtains a facial image of the target user and matches the facial image against facial image samples in a dynamic facial sample library. A gate associated with the traffic station is controlled based on a result of a matching operation performed with the facial image and the facial image samples in the dynamic facial sample library.

20 Claims, 6 Drawing Sheets

(51) Int. Cl.
    G07C 9/28      (2020.01)
    G07B 15/04     (2006.01)
    G06K 9/00      (2006.01)
    G06Q 20/00     (2012.01)
    G06Q 20/04     (2012.01)
    G06Q 20/40     (2012.01)
(52) U.S. Cl.
    CPC ......... *G06Q 20/00* (2013.01); *G06Q 20/3278* (2013.01); *G07B 15/04* (2013.01); *G07C 9/257* (2020.01); *G07C 9/28* (2020.01); *G06Q 20/0457* (2013.01); *G06Q 20/3224* (2013.01); *G06Q 20/40145* (2013.01); *G06Q 2240/00* (2013.01); *G07C 2209/02* (2013.01)
(58) Field of Classification Search
    USPC ......................................................... 340/5.6
    See application file for complete search history.

(56) References Cited

U.S. PATENT DOCUMENTS

| | | | |
|---|---|---|---|
| 7,362,210 | B2 | 4/2008 | Bazakos et al. |
| 7,634,662 | B2 | 12/2009 | Monroe |
| 8,411,909 | B1 | 4/2013 | Zhao et al. |
| 8,457,367 | B1 | 6/2013 | Sipe et al. |
| 10,685,519 | B2 * | 6/2020 | Xu .................. G06K 9/00255 |
| 2005/0055582 | A1 | 3/2005 | Bazakos et al. |
| 2006/0071791 | A1 | 4/2006 | Meyers et al. |
| 2017/0268205 | A1 | 9/2017 | Schirado |
| 2017/0329777 | A1 | 11/2017 | Vlugt et al. |
| 2018/0262891 | A1 | 9/2018 | Wu et al. |
| 2019/0206158 | A1 | 7/2019 | Xu |

FOREIGN PATENT DOCUMENTS

| | | |
|---|---|---|
| CN | 101414387 | 4/2009 |
| CN | 106779637 | 5/2017 |
| CN | 106780792 | 5/2017 |
| CN | 107301696 | 10/2017 |
| DE | 102015010184 | 2/2017 |
| EP | 3232408 | 10/2017 |
| TW | 201351307 | 12/2013 |
| WO | WO 2016200671 | 12/2016 |
| WO | WO 2017025193 | 2/2017 |

OTHER PUBLICATIONS

International Search Report and Written Opinion in International Application No. PCT/US2018/067906, dated Apr. 17, 2019, 15 pages.

Nakamoto, "Bitcoin: a Peer-to-Peer Electronic Cash System," www.bitcoin.org, 2005, 9 pages.

Second Written Opinion in International Application No. PCT/US2018/067906, dated Dec. 3, 2019, 10 pages.

International Preliminary Report on Patentability in International Application No. PCT/US2018/067906, dated Apr. 16, 2020, 11 pages.

* cited by examiner

```
┌─────────────────────────────────────────────────────────────┐
│ A wireless access device deployed at a traffic station      │
│ performs short-range wireless communication with a mobile   │──102
│ device entering a signal coverage area, detects a commuter  │
│ whose identity information is associated with the traffic   │
│ station, and creates a dynamic facial sample library based  │
│ on a facial image sample of the detected commuter           │
└─────────────────────────────────────────────────────────────┘
                              │
                              ▼
┌─────────────────────────────────────────────────────────────┐
│ Obtain a facial image of a target user collected by a       │──104
│ capturing device deployed at the traffic station            │
└─────────────────────────────────────────────────────────────┘
                              │
                              ▼
┌─────────────────────────────────────────────────────────────┐
│ Match the facial image against facial image samples in the  │
│ dynamic facial sample library, where the dynamic facial     │
│ image sample library includes facial image samples of       │──106
│ commuters who are detected by the traffic station within a  │
│ passing period of the commuter at the traffic station and   │
│ whose identity information is associated with the traffic   │
│ station                                                     │
└─────────────────────────────────────────────────────────────┘
                              │
                              ▼
┌─────────────────────────────────────────────────────────────┐
│ Control a gate to allow the target user to pass if the      │──108
│ facial image matches any facial image sample in the dynamic │
│ facial sample library                                       │
└─────────────────────────────────────────────────────────────┘
```

FIG. 1

TRAFFIC DETECTION METHOD, DEVICE, AND SYSTEM

CROSS-REFERENCE TO RELATED APPLICATIONS

This application is a continuation of U.S. patent application Ser. No. 16/235,653, filed on Dec. 28, 2018, which claims priority to Chinese Patent Application No. 201711479122.3, filed on Dec. 29, 2017, each application is hereby incorporated by reference in its entirety.

TECHNICAL FIELD

The present specification relates to the field of computer applications, and in particular, to a traffic detection method, device, and system.

BACKGROUND

With continuous popularization and development of mobile payment technologies, mobile payment not only brings more convenience to people's daily lives, but also gradually changes the ways people travel. Currently, more and more public transportation carriers start to support mobile payment, so that users using public transportation can quickly pass through traffic stations by using mobile payment. For example, more and more traffic stations start to use technologies such as quick response code and near field communication (NFC), so that the users can quickly pass through gates of the traffic stations by scanning the quick response code or by tapping their phone.

SUMMARY

The present specification provides a traffic detection method, including: performing, by a wireless access device deployed at a traffic station, short-range wireless communication with a mobile device entering a signal coverage area, detecting a commuter whose identity information is associated with the traffic station, and creating a dynamic facial sample library based on a facial image sample of the detected commuter; obtaining a facial image of a target user collected by a capturing device deployed at the traffic station; matching the facial image against facial image samples in the dynamic facial sample library; and controlling a gate to allow the target user to pass if the facial image matches any facial image sample in the dynamic facial sample library.

Optionally, the performing, by a wireless access device deployed at a traffic station, short-range wireless communication with a mobile device entering a signal coverage area, and detecting a commuter whose identity information is associated with the traffic station includes obtaining identity information uploaded by the mobile device and collected when the wireless access device performs short-range wireless communication with the mobile device entering the signal coverage area; and selecting the identity information associated with the traffic station from the obtained identity information based on a locally stored mapping relationship between identity information and a traffic station.

Optionally, the creation of a dynamic facial sample library based on a facial image sample of the detected commuter includes further selecting identity information collected within a passing period of the target user at the traffic station from the selected identity information associated with the traffic station; and querying a facial image sample corresponding to the selected identity information, and creating the dynamic facial image sample library based on the queried facial image sample.

Optionally, the method further includes obtaining registration information uploaded by a traffic client device, where the registration information includes a traffic station selected by a commuter and identity information of the commuter; and creating a mapping relationship between the traffic station selected by the commuter and the identity information of the commuter, and locally storing the mapping relationship.

Optionally, before the querying a facial image sample corresponding to the selected identity information, the method further includes determining, by the wireless access device, a distance between the mobile device entering the signal coverage area and the gate; selecting a target mobile device whose distance from the gate is less than a predetermined threshold and/or a target mobile device whose distance from the gate decreases, based on the determined distance; and further selecting identity information uploaded by the target mobile device from the selected identity information.

Optionally, the passing period is a time period with a predetermined duration before the facial image of the target user is captured.

Optionally, the identity information of the commuter includes a hardware identifier of a commuter's mobile device.

Optionally, the facial image samples in the dynamic facial sample library are bonded with payment accounts in advance; and the controlling a gate to allow the commuter to pass if the facial image matches any facial image sample in the facial sample library includes the following: if the facial image matches any facial image sample in the facial sample library, performing payment deduction from a payment account bonded with the facial image sample, and controlling the gate to allow the commuter to pass after the deduction is completed.

Optionally, the traffic station is a metro station.

The present specification further provides a traffic detection device, including a creation module, configured to perform, by using a wireless access device deployed at a traffic station, short-range wireless communication with a mobile device entering a signal coverage area, detect a commuter whose identity information is associated with the traffic station, and create a dynamic facial sample library based on a facial image sample of the detected commuter; an acquisition module, configured to obtain a facial image of a commuter, collected by a capturing device deployed at the traffic station; a matching module, configured to match the facial image against facial image samples in the dynamic facial sample library; and a control module, configured to control a gate to allow the commuter to pass if the facial image matches any facial image sample in the dynamic facial sample library.

Optionally, the creation module is further configured to obtain identity information uploaded by the mobile device and collected when the wireless access device performs short-range wireless communication with the mobile device entering the signal coverage area; and select the identity information associated with the traffic station from the obtained identity information based on a locally stored mapping relationship between identity information and a traffic station.

Optionally, the creation module is further configured to further select identity information collected within a passing period of the target user at the traffic station from the selected identity information associated with the traffic station; and query a facial image sample corresponding to the selected identity information, and create the dynamic facial image sample library based on the queried facial image sample.

Optionally, the creation module is further configured to obtain registration information uploaded by a traffic client device, where the registration information includes a traffic station selected by a commuter and identity information of the commuter; and create a mapping relationship between the traffic station selected by the commuter and the identity information of the commuter, and locally store the mapping relationship.

Optionally, the creation module is further configured to determine a distance between the mobile device entering the signal coverage area and the gate by using the wireless access device before querying the facial image sample corresponding to the selected identity information; select a target mobile device whose distance from the gate is less than a predetermined threshold and/or a target mobile device whose distance from the gate decreases, based on the determined distance; and further select identity information uploaded by the target mobile device from the selected identity information.

Optionally, the passing period is a time period of predetermined duration before the facial image of the target user is captured.

Optionally, the identity information of the commuter includes a hardware identifier of a mobile device of the commuter.

Optionally, the facial image samples in the dynamic facial sample library are bonded with payment accounts in advance; and the control module is further configured to perform payment deduction from a payment account bonded with the facial image sample, and control the gate to allow the commuter to pass after the deduction is completed, if the facial image matches any facial image sample in the facial sample library payment deduction.

The present specification further provides a traffic detection system, including a wireless access device deployed at a traffic station, configured to perform short-range wireless communication with a mobile device entering a signal coverage area, and detect a commuter whose identity information is associated with the traffic station; a capturing device deployed at the traffic station, configured to capture a facial image of a target user and upload the collected facial image to a server, and allow the commuter to pass in response to a pass-through instruction delivered by the server; and the server, configured to create a dynamic facial sample library based on a facial image sample of the commuter detected by the wireless access device, obtain a facial image collected by a gate, match the facial image against facial image samples in the dynamic facial sample library, and deliver the pass-through instruction to the gate if the facial image matches any facial image sample in the dynamic facial sample library.

Optionally, the server is further configured to obtain identity information uploaded by the mobile device and collected when the wireless access device performs short-range wireless communication with the mobile device entering the signal coverage area; and select the identity information associated with the traffic station from the obtained identity information based on a locally stored mapping relationship between identity information and a traffic station.

Optionally, the server is further configured to further select identity information collected within a passing period of the target user at the traffic station from the selected identity information associated with the traffic station; and query a facial image sample corresponding to the selected identity information, and create the dynamic facial image sample library based on the queried facial image sample.

Optionally, the system further includes a traffic client device, configured to identify a commuter of the traffic station, and send a registration notification to the identified commuter; and obtain registration information entered by the commuter, and upload the registration information to the server, where the registration information includes a traffic station selected by the commuter and identity information of the commuter; and the server is further configured to obtain the registration information uploaded by the traffic client device; create a mapping relationship between the traffic station selected by the commuter and the identity information of the commuter, and locally store the mapping relationship.

Optionally, the server is further configured to determine a distance between the mobile device entering the signal coverage area and the gate by using the wireless access device before querying the facial image sample corresponding to the selected identity information; select a target mobile device whose distance from the gate is less than a predetermined threshold and/or a target mobile device whose distance from the gate decreases, based on the determined distance; and further select identity information uploaded by the target mobile device from the selected identity information.

Optionally, the passing period of the target user is a time period of predetermined duration before the facial image of the target user is captured.

Optionally, the identity information of the commuter includes a hardware identifier of a mobile device of the commuter.

Optionally, the facial image samples in the dynamic facial sample library are bonded with payment accounts in advance; and the server is further configured to perform payment deduction from a payment account bonded with the facial image sample, and deliver the pass-through instruction to the gate after the deduction is completed, if the facial image matches any facial image sample in the facial sample library.

The present specification further provides an electronic device, including a processor; and a memory, configured to store a machine executable instruction; where by reading and executing a machine executable instruction stored in the memory and corresponding to traffic detection control logic, the processor is configured to perform, by using a wireless access device deployed at a traffic station, short-range wireless communication with a mobile device entering a signal coverage area, detect a commuter whose identity information is associated with the traffic station, and create a dynamic facial sample library based on a facial image sample of the detected commuter; obtain a facial image of a commuter collected by a capturing device deployed at the traffic station; match the facial image against facial image samples in the dynamic facial sample library; and control a gate to allow the commuter to pass if the facial image matches any facial image sample in the dynamic facial sample library.

According to the technical solutions provided in the implementations of the present specification, when the commuter passes through the gate through face recognition, a quantity of facial image samples can be reduced due to the facial image sample of the commuter, whose identity information is associated with the traffic station and who is detected when the wireless access device deployed at the traffic station performs short-range wireless communication with the mobile device entering the signal coverage area. Therefore, facial recognition efficiency can be improved, a processing delay caused by performing facial recognition and matching can be shortened, and the passing speed when a commuter passes through the gate can be increased.

BRIEF DESCRIPTION OF DRAWINGS

FIG. 1 is a flowchart illustrating a traffic detection method, according to an implementation of the present specification;

DESCRIPTION OF IMPLEMENTATIONS

Figure 2:
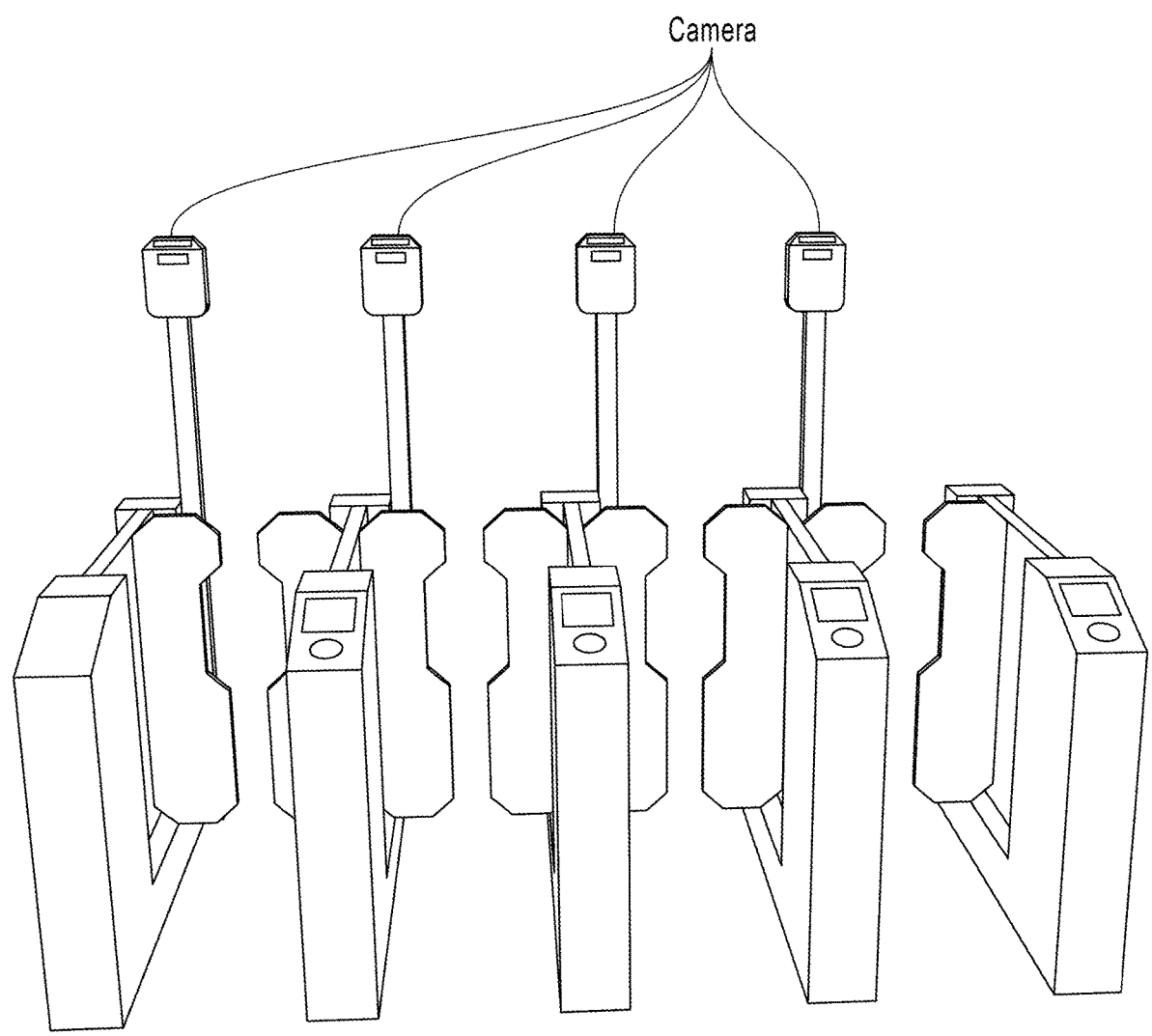
FIG. 2 is a schematic diagram illustrating a gate, according to an implementation of the present specification.

The present specification aims to provide a technical solution that a quantity of facial image samples used for facial recognition and matching when face scan is performed to a commuter passes through a gate can be reduced to improve facial recognition efficiency. As such, the user can pass through traffic gate more quickly.

In implementation, before a target user arrives at a gate of a traffic station, a wireless access device deployed at the traffic station can perform short-range wireless communication with a mobile device entering a signal coverage area, detect a commuter whose identity information is associated with the traffic station, and pre-create a dynamic facial sample library based on a facial image sample of the detected commuter.

When the target user arrives at the gate of the traffic station, the gate can capture a facial image of the target user, and match the facial image against facial image samples in the dynamic facial sample library.

When the facial image matches any facial image sample in the dynamic facial sample library, it indicates that identity information of the target user has been associated with the traffic station. In this case, the gate can allow the user to pass.

In the previous technical solution, in a process of performing facial recognition and matching on the commuter, a quantity of facial recognition samples used for facial recognition and matching can be reduced due to the facial image sample of the commuter whose identity information is associated with the traffic station and who is detected when the wireless access device deployed at the traffic station performs short-range wireless communication with the mobile device entering the signal coverage area. Therefore, facial recognition efficiency can be significantly improved, a processing delay generated when facial recognition and matching is performed on the commuter can be shortened, and a traffic speed when the commuter passes through the gate can be increased.

The following describes the present specification by using specific implementations with reference to specific application scenarios.

Referring to FIG. 1, FIG. 1 shows a traffic detection method provided in an implementation of the present specification. The method is applied to a server and includes the following steps:

Step 102: A wireless access device deployed at a traffic station performs short-range wireless communication with a mobile device entering a signal coverage area, detects a commuter whose identity information is associated with the traffic station, and creates a dynamic facial sample library based on a facial image sample of the detected commuter.

Step 104: Obtain a facial image of a commuter collected by a capturing device deployed at the traffic station.

Step 106: Match the facial image against facial image samples in the dynamic facial sample library.

Step 108: Control a gate to allow the target user to pass if the facial image matches any facial image sample in the dynamic facial sample library.

The traffic station can specifically include any public transportation station that needs to be accessed by using a gate, for example, a metro station, a bus station, or a high-speed railway station, or can include some non-public transportation stations where densely populated commuters need to pass through gates, for example, some large commercial places and non-commercial places. Implementations are not particularly limited in the present specification.

The commuter can be a person who enters the traffic station and needs to pass through the traffic station on a regular basis. The target user can be a commuter who passes through the gate deployed at the traffic station through face scan.

The server includes a background server, a server cluster, or a service platform established based on the server cluster, to serve the capturing device deployed at the traffic station. For example, a traffic station operator can cooperate with a third-party payment institution, to connect a traffic gate deployed offline and a third-party online payment platform. The online payment platform provides the gate with services such as facial recognition for a commuter, traffic payment and settlement deduction, and pass-through instruction delivering.

The gate can include a capturing device (for example, a camera) used to capture a facial image of a commuter, and support "passing through face recognition". For example, referring to FIG. 2, FIG. 2 is a schematic diagram illustrating a gate that includes a camera and supports "passing through face recognition", according to the present specification. Certainly, in actual applications, the capturing device may not be included in the gate, but deployed at the traffic station as an independent device. When the commuter passes through the gate, the gate can use the camera to capture the facial image of the commuter, and transmit the facial image to the background server and the background server identifies the facial image. The gate can be deployed at an entrance or an exit of the traffic station.

The identity information of the commuter can specifically include any information associated with an identity of the commuter, for example, user information such as profile data and a personal account of the commuter, and a hardware identifier (for example, a MAC address) of a mobile device of the user.

Figure 3:
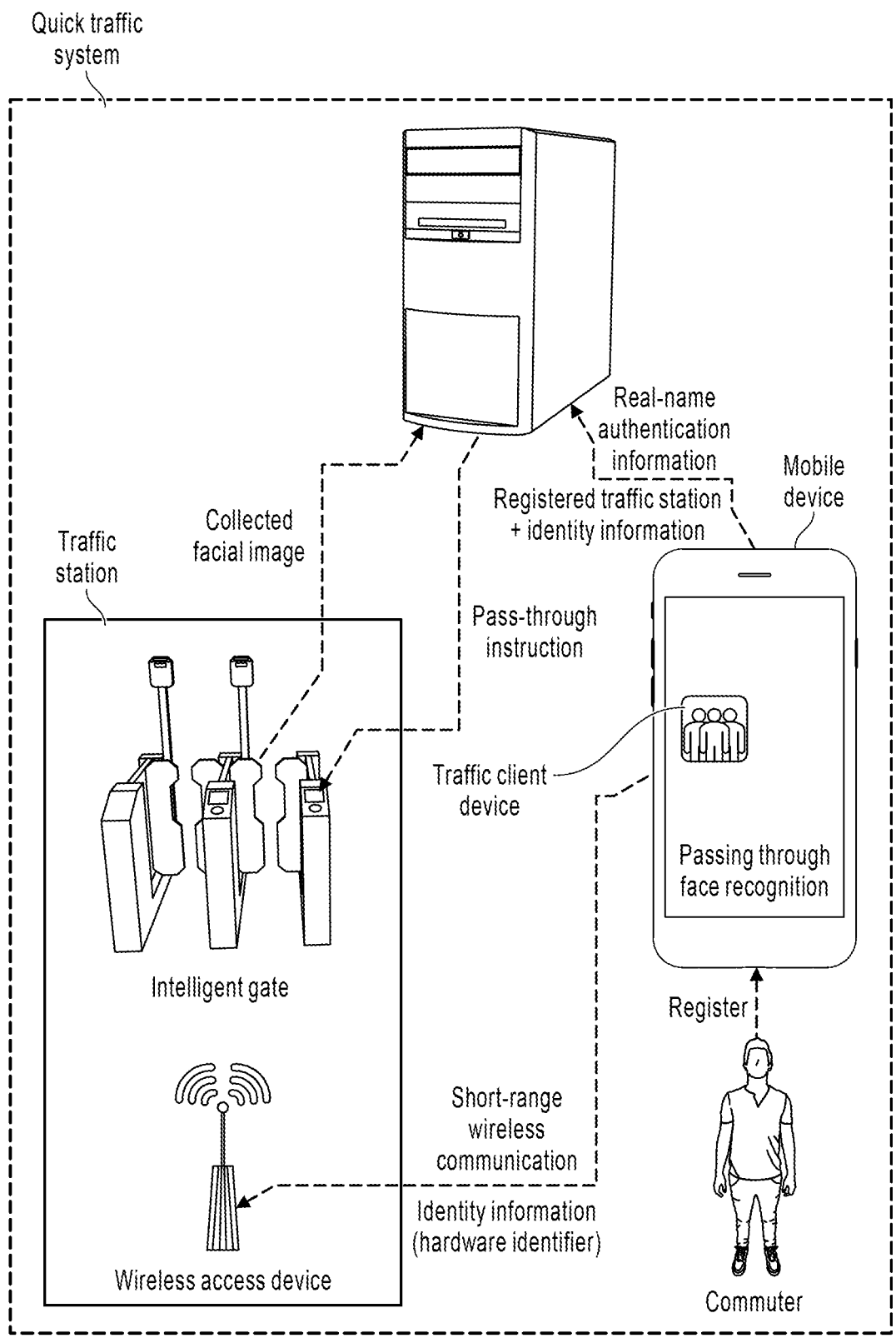
FIG. 3 is a structural diagram illustrating a traffic detection system, according to an implementation of the present specification.

Referring to FIG. 3, FIG. 3 is a structural diagram illustrating a traffic detection system, according to the present specification.

As shown in FIG. 3, the traffic detection system can include nodes such as a background server, a gate deployed at a traffic station, a wireless access device deployed at the traffic station, and a traffic client device.

The gate can capture a facial image of a commuter by using an included capturing device (for example, a camera), communicate with the background server, transmit the collected facial image to the background server for facial recognition, and allow the commuter to pass in response to a pass-through instruction delivered by the server.

The background server serving the gate can dynamically create a dynamic facial sample library used for facial recognition and matching the facial image samples to commuters who enter the traffic station within passing periods of the corresponding commuters whose identity information is associated with the traffic station. As such, a quantity of facial image samples used during facial recognition and matching can be reduced. The facial image uploaded by the gate is matched against facial image samples in the dynamic facial sample library, and facial recognition is performed on the commuter, to determine whether the commuter is a real-name authentication user whose identity information is associated with the traffic station. If the commuter is the real-name authentication user of the traffic station, the pass-through instruction is delivered to the intelligent gate.

The wireless access device can perform short-range wireless communication with a mobile device entering a signal coverage range, collect identity information of a commuter that is uploaded by the mobile device, communicate with the background server, and upload the collected identity information to the background server. The background server queries facial image samples of commuters of each traffic station based on the uploaded identity information. For example, in actual applications, a facial image sample of a commuter can be reserved by the user in the server in a registration phase, and is associated with identity information. Alternatively, the background server can query facial image samples from a credit institution maintaining facial image samples of commuters (a public security system maintaining citizen's personal identity information) based on identity information of the commuters.

A specific hardware type of the wireless access device is not particularly limited in the present specification. For example, in actual applications, a wireless access device supporting short-range wireless communication methods such as Wi-Fi and Bluetooth can be used.

The traffic client device provides a registration service of a traffic station for a commuter. By using the traffic client device, the commuter can complete real-name registration and use a payment account to authorize a traffic station, where the user wants to pass through the face recognition. The traffic client device can identify a commuter of a traffic station, send a registration notification to the identified commuter, invite the commuter of the traffic station to complete traffic station registration and selection, upload a traffic station selected by the user and identity information of the commuter to the background server, and associate the traffic station selected by the user with identity information of the commuter.

With reference to the structural diagram of the traffic detection system shown in FIG. 3, the following describes in detail the technical solutions of the present specification in three phases: "passing through face recognition", "creation of a dynamic facial sample library", and "quick gate passing through face scan".

(1) Registration for Passing Through Face Recognition

In an initial state, a user can submit personal real-name authentication information to the background server in advance by using a traffic client device installed on a mobile device, to complete real-name authentication and obtain the access of using the traffic client device.

In the real-name authentication phase, the real-name authentication information submitted by the user can carry a facial image of the user, or can merely carry some identity information that does not include the facial image.

After the user completes real-name authentication on the traffic client device, the traffic client device can identify whether the user is a commuter of a traffic station in a daily traffic process of the user, send a registration notification to the identified commuter by using a user interface, and invite the commuter to register with a traffic station where the user wants to pass through the gate through face scan.

A specific method that the traffic client device identifies whether a common user is a commuter of a traffic station in the background is not specifically limited in the present specification.

For example, in an implementation, the traffic client device can identify whether a user is a commuter of a traffic station based on a real-time location of the user in a daily traffic process. In this case, the traffic client device can collect a location of the user in real time, and count a quantity of daily traffic times of the user at the traffic station based on the location of the user. If the counted quantity of traffic times of the user at the traffic station reaches a certain number, it indicates that the traffic station is a traffic station that the user frequently passes through in daily life. In this case, it can be determined that the user is the commuter of the traffic station, and a registration notification is sent to the user by using a user interface, to invite the user to register the traffic station as a traffic station where the user can pass through the gate through face scan.

After receiving the registration notification sent by the traffic client device, the user can select a traffic station where the user wants to pass through the gate through face scan from a registration invitation interface provided by the traffic client device, to complete traffic station registration. In addition to selecting the traffic station where the user wants to pass through the gate through face scan, if the traffic station is a public transportation station that the user needs to pay traffic fees to, the user further can select a personal account for payment to the traffic station on the registration invitation interface, and use the personal payment account to authorize payment to the registered traffic station where the user wants to pass through the gate through face scan.

For example, the traffic station is a metro station. The user can register two commuting metro stations as the metro stations where the user wants to pass through the gate through face scan in the registration invitation interface, and select a corresponding payment account from the option "payment method" provided in the registration invitation interface for payment authorization, to serve as a payment account from which metro traffic fees are deducted.

When the user is registering a traffic station by using the registration invitation interface, the traffic client device can obtain the traffic station selected by the user in the registration invitation interface and identity information of the user in the background (if the traffic station is a public transportation station, a payment account authorized by the user can be further included), add the obtained information to registration information, and upload the registration information to the background server.

After receiving the registration information uploaded by the traffic client device, the background server can obtain information such as the traffic station selected by the user and the identity information of the user that are carried in the registration information, create a mapping relationship between the traffic station selected by the commuter and the identity information of the commuter, and locally store the mapping relationship.

It is worthwhile to note that in the present specification, the traffic station mainly uses the deployed wireless access device to collect the identity information of the commuter entering the traffic station. To be specific, after entering the signal coverage area of the wireless access device, the commuter needs to perform short-range wireless communication with the wireless access device and upload the personal identity information to the wireless access device. In this case, because real-name authentication information of the user is directly uploaded to the access device by using the mobile device, a security risk such as user privacy information leakage can occur.

In view of this, in an implementation, the identity information of the user (the identity information of the user that is carried in the registration information) that is submitted to the background server when the user registers the traffic station can be a specific hardware identifier (for example, the MAC address) of the user's mobile device.

In this case, the user can also submit the hardware identifier of the personal mobile device to the background server in the phase of real-name authentication on the traffic client device. The background server associates the real-name authentication identity information of the user with the hardware identifier of the personal mobile device, so that the background server can subsequently query the real-name authentication identity information reserved by the user based on the hardware identifier of the mobile device of the user, avoiding a security risk caused by transmitting true real-name authentication information of the user in a public network environment.

When the mapping relationship is created, the commuter completes traffic station registration. When the commuter subsequently passes through the traffic station, the gate deployed at the traffic station can initiate facial recognition for the user to quickly allow the user to pass.

(2) Creation of a Dynamic Facial Sample Library

In the present specification, the dynamic facial sample library is dynamically created to be used for facial recognition and matching, based on facial image samples of all commuters whose identity information has been associated with the traffic station and who are detected by the traffic station and enter the traffic station (i.e. commuters completing traffic station registration).

In the present method, a quantity of facial image samples in the facial image sample library can be dynamically reduced to a relatively small number.

In an implementation, the dynamic facial sample library can specifically be a facial image sample library dynamically created based on facial image samples of all commuters whose identity information has been associated with the traffic station and who are detected by the traffic station and enter the traffic station within the passing period of the target user at the traffic station.

Therefore, a quantity of facial image samples in the dynamic facial sample library can be further reduced due to facial image samples of commuters detected by the traffic station within the passing period of the target user at the station, where the target user needs to pass through the gate through face scan at the station.

Because different target users have different passing periods at a same traffic station, facial image samples in the dynamic sample library are also different.

In the present specification, the passing period of the target user at the traffic station can be a time period specifically corresponding to or covering a time interval from a moment that the commuter enters the traffic station to a moment that the commuter successfully passes through the gate.

For example, in an implementation, the passing period can be specifically a time period of predetermined duration before a moment that the gate collects the facial image of the commuter. The predetermined duration can be customized by the operator of the traffic station based on an actual requirement, provided that a time interval from a moment that a user enters the station to a moment that the user passes through the gate can be covered to a maximum extent. For example, the operator can estimate how long it takes for a user to walk from the entrance of the metro station to the gate, and then set the predetermined duration based on the estimated time.

In the present specification, the traffic station can deploy the wireless access device at the traffic station, and perform, by using the wireless access device, short-range wireless communication with a mobile device carried by a user entering the traffic station, to detect the commuter entering the traffic station.

In an initial state, the traffic station can establish an open wireless network by using the wireless access device deployed at the traffic station (for example, deployed at an entrance or an exit of the traffic station). When the commuter carrying the mobile device enters a signal coverage area of the wireless network, the traffic client device can notify the user whether to access the wireless network.

After the mobile device carried by the user accesses the wireless network, the wireless access device can perform short-range wireless communication with the mobile device carried by the user by using the wireless network, detect a commuter entering the signal coverage area, collect identity information of the commuter uploaded by the mobile device, and upload the collected identity information to the background server at a scheduled time.

A specific method of short-range wireless communication supported by the wireless access device is not specifically limited in the present specification, and can include any short-range wireless communication method (for example, Wi-Fi, Bluetooth, and radio frequency).

For example, in an implementation, the wireless access device can be specifically an iBeacon base station based on Bluetooth. The iBeacon base station can create a wireless signal coverage area by using the Bluetooth technology of low power consumption. When the commuter carrying the mobile device enters the wireless signal coverage area, the iBeacon base station can use the traffic client device to notify the user whether to access the wireless network. After accessing the wireless network, the user's mobile device can perform short-range wireless communication with the iBeacon base station by using an included Bluetooth module, and submit identity information to the wireless access device.

In the present specification, after obtaining the identity information uploaded by the wireless access device, the background server can perform multilevel selection on the obtained identity information.

In an implementation, the multilevel selection can specifically include first-level selection when the commuter enters the traffic station, second-level selection when the commuter approaches the gate, and third-level selection when the gate collects the facial image of the commuter.

First, after the commuter carrying the mobile device enters the signal coverage area of the wireless access device, the background server can perform first-level selection on the identity information uploaded by the wireless access device, based on a locally stored mapping relationship between identity information and a traffic station, and select identity information associated with the traffic station from the identity information, to be specific, select identity information of a commuter who has registered the traffic station as a traffic station where the user wants to pass through the gate through face scan.

Second, in a process that the commuter carrying the mobile device approaches the gate, the background server can further perform second-level selection on the selected identity information.

In this case, the wireless access device can further precisely locate the mobile device entering the signal coverage area by using an indoor location technology, and determine, based on the location, a distance between the mobile device and the gate deployed at the traffic station.

For example, the gate is a iBeacon base station. The gate and the mobile device of the user can separately include iBeacon hardware, and the iBeacon base station can locate, in real time based on the indoor location technology of the iBeacon, the mobile device entering the signal coverage area to obtain a distance between the mobile device and the intelligent gate deployed at the traffic station. A specific process of performing indoor location based on the iBeacon is not described in detail in the present specification. When a person skilled in the art implements the technical solutions of the present specification, references can be made to a related technology.

Further, the wireless access device can further select a mobile device "approaching" the gate, based on a change of the distance between the located mobile device entering the signal coverage area and the intelligent gate deployed at the traffic station. The background server further selects identity information uploaded by the mobile device approaching the gate from the initially selected identity information.

In an implementation, when the mobile device "approaching" the gate is selected, a mobile device whose distance from the gate is less than a predetermined threshold can be selected; and/or a mobile device whose distance from the gate decreases is selected. In other words, in the present specification, a mobile device within a certain range of the gate, and a mobile device whose distance from the gate continuously decreases and that continuously approaches the gate are used as a mobile device "approaching" the gate.

Finally, after the background server completes the previous two levels of selection, after the gate collects the facial image of the commuter, the gate can perform third-level selection on the selected identity information, and further select identity information collected within the passing period of the commuter at the traffic station.

In an implementation, the passing period of the target user at the traffic station can be specifically a time period of predetermined duration before a moment that the gate collects the facial image of the commuter (for example, 30 minutes before a moment that the facial image is collected).

The time the facial image of the target user is captured can be specifically represented by the time that the gate collects the facial image of the target user, or can be identified by the time the background server receives the uploaded facial image, which is not particularly limited in the present specification.

Certainly, in practical scenarios, the passing period of the target user at the traffic station can be determined in other ways. For example, the passing period of the target user at the traffic station can be specifically represented by an operation period corresponding to the time of the facial image of the target user is captured. Other ways are not described one by one in the present specification.

It is worthwhile to note that the multilevel selection sequence shown above is merely an example, and is not particularly limited in the present specification. In actual applications, a person skilled in the art can change the multilevel selection sequence shown above based on an actual need.

In the present specification, after completing the multilevel selection shown above, the background server can query a facial image sample corresponding to the final selected identity information. The facial image sample corresponding to the selected identity information can be queried from a local database, or can be queried from a third-party credit institution (for example, a public security system) maintaining the facial image sample of the commuter.

For example, the selected identity information is the hardware identifier of the commuter's mobile device. Assume that the commuter's facial image sample is preserved on the background server in a phase of real-name authentication on the traffic client device. In this case, the background server can use the hardware identifier of the commuter's mobile device as a query index to query the real-name authentication information reserved by the user, and directly obtain the facial image sample from the real-name authentication information.

Or assume that the commuter does not reserve the personal facial image sample on the background server in a phase of real-name authentication on the traffic client device. In this case, the background server can use the hardware identifier of the mobile device of the commuter as a query index to query the real-name authentication information reserved by the user, and query the facial image sample of the user from a third-party credit institution based on the real-name authentication information.

In the present specification, after the background server queries the facial image sample corresponding to the finally selected identity information, the dynamic facial sample library can be created based on the queried facial image sample.

(3) Quick Gate Passing Through Face Scan

In the present specification, after collecting the facial image of the target user, the gate can initiate facial recognition and matching for the facial image, and upload the facial image sample to the background server.

After receiving the facial image of the target user, the background server can separately match the facial image against the facial image samples in the created dynamic facial sample library to perform facial recognition on the facial image.

A specific facial recognition process is not described in detail in the present specification. References can be made to a related technology by a person skilled in the art. For example, in an implementation, the facial image samples in the dynamic facial sample library can be used as samples for machine learning training to construct a facial recognition model. Then, a facial image waiting to be recognized is entered into the trained facial recognition model to obtain a facial recognition result.

In the present specification, when it is determined that the facial image matches any facial image sample in the dynamic facial sample library by using the facial recognition process, it can be considered that the target user is a real-name authenticated user who has registered the traffic station. In this case, the background server can remotely control the gate, and deliver the pass-through instruction to the gate. After receiving the pass-through instruction, the gate can allow the commuter to pass in response to the pass-through instruction.

If the traffic station is a public transportation station that the user needs to pay traffic fees to, the background server can further bind the payment account authorized by the commuter who has registered the traffic station in the station registration phase with the corresponding facial image sample. When it is determined that the facial image matches any facial image sample in the dynamic facial sample library, the traffic fees can be first deducted from the payment account bound with the facial image sample. After the transaction is completed, the pass-through instruction is delivered to the gate.

Certainly, when it is determined that no facial image matches the facial image sample in the dynamic facial sample library in the facial recognition process, the target user may not be a registered user of the traffic station, or the target user carries a mobile device of another user. In this case, the background server may not deliver the pass-through instruction to the gate, or directly delivers an access rejection instruction. In this case, the user can continue to pass through the gate in a way other than face scan, for example, by "tapping the phone" or "showing the ID".

Because a quantity of facial image samples in the dynamic facial sample library can be reduced to a relatively small value, the background server can still complete facial recognition and matching in a relatively short period of time at some public transportation stations where commuters are densely populated. Therefore, a processing delay generated during facial recognition and matching can be shortened, and a traffic speed when the commuter passes through the gate can be increased.

Use a metro station for example. There may be only hundreds of users who enter the metro station and register the metro station within passing periods of the commuters at the traffic station (for example, within 30 minutes), and the background server can complete facial recognition and scan hundreds of facial image samples in a matter of milliseconds.

In the previous implementation, the background server serving the gate deployed at the traffic station and performing step 101 to step 106 is described in detail. It is also worthwhile to note that in practical scenarios, step 101 to step 106 can also be performed by the gate. To be specific, both the creation of the dynamic facial sample library and the facial recognition and matching of the commuter can be independently completed by the gate.

In this case, step 101 to step 106 can be execution logic in a processor included in the gate. The processor included in the gate can interact with the wireless access device, create the dynamic facial sample library, obtain the facial image of the target user collected by the gate by using the included camera, and match the facial image against the facial image samples in the automatically created dynamic facial sample library, to complete the facial recognition process. When identifying that the commuter is the commuter who has registered the traffic station, the processor can deliver the pass-through instruction to gate hardware included in the gate by using an instruction channel in the device, and control the gate hardware to allow the commuter to pass.

Implementation details of the gate as the execution body are omitted in the present specification. When a person skilled in the art implements the technical solutions of the present specification, references can be made to the previous implementations.

Corresponding to the previous method implementation, the present specification further provides an implementation of a traffic detection device. The implementation of the traffic detection device in the present specification can be applied to an electronic device. The electronic device can be a gate deployed at a traffic station, or can be a background server serving the gate.

Figure 4:
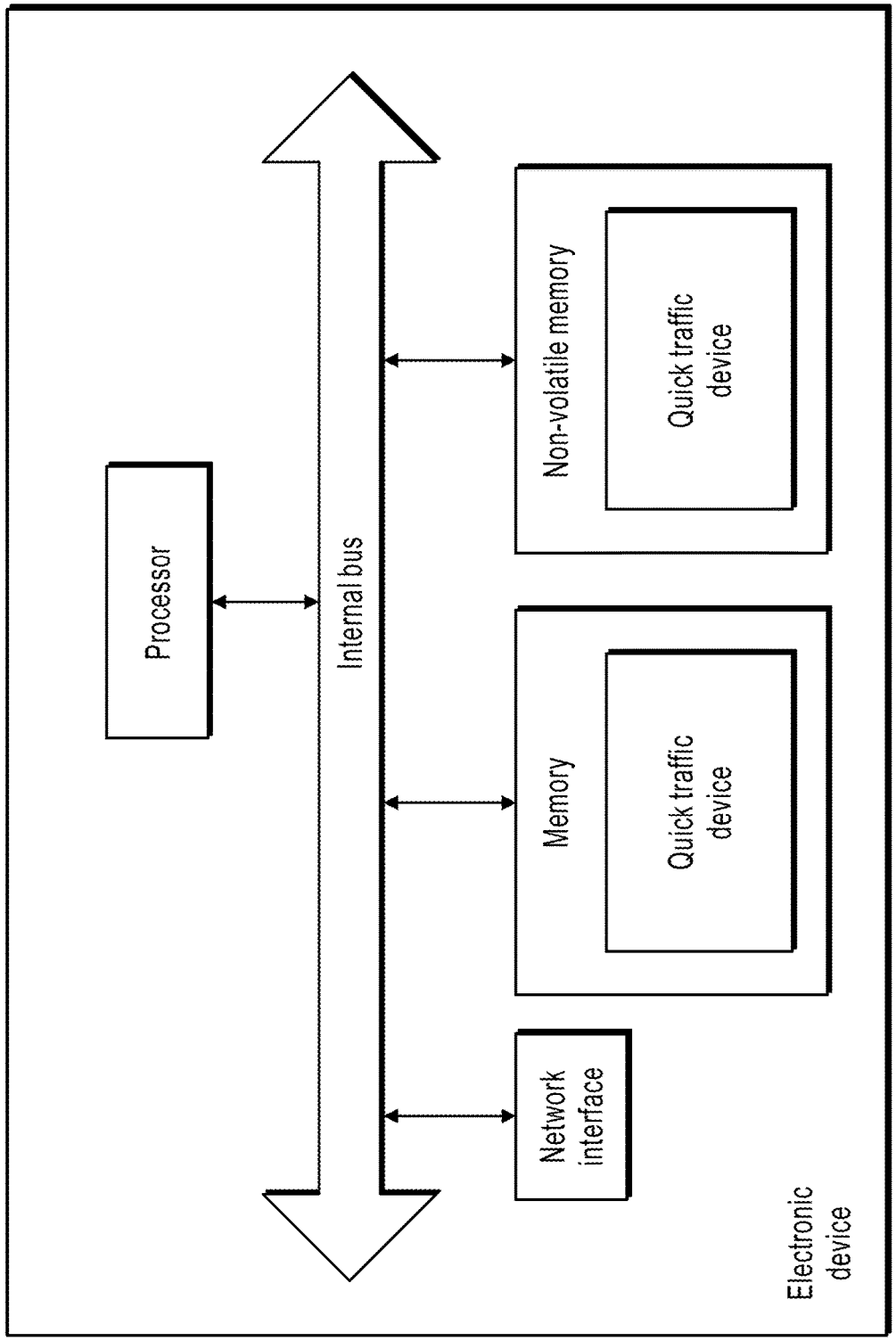
FIG. 4 is a structural diagram illustrating hardware in an electronic device including a traffic detection device, according to an implementation of the present specification.

The device implementation can be implemented by using software, hardware, or a combination of software and hardware. The software implementation is used as an example. As a logical device, a processor of the electronic device can read a corresponding computer program instruction from a non-volatile storage to a memory and runs the instruction. From a perspective of hardware, as shown in FIG. 4, FIG. 4 is a structure diagram illustrating hardware of an electronic device accommodating a traffic detection device, according to the present specification. In addition to a processor, a memory, a network interface, and a non-volatile storage shown in FIG. 4, the electronic device accommodating the device in the implementation usually can further include other hardware based on an actual function of the electronic device. Details are omitted here for simplicity.

Figure 5:
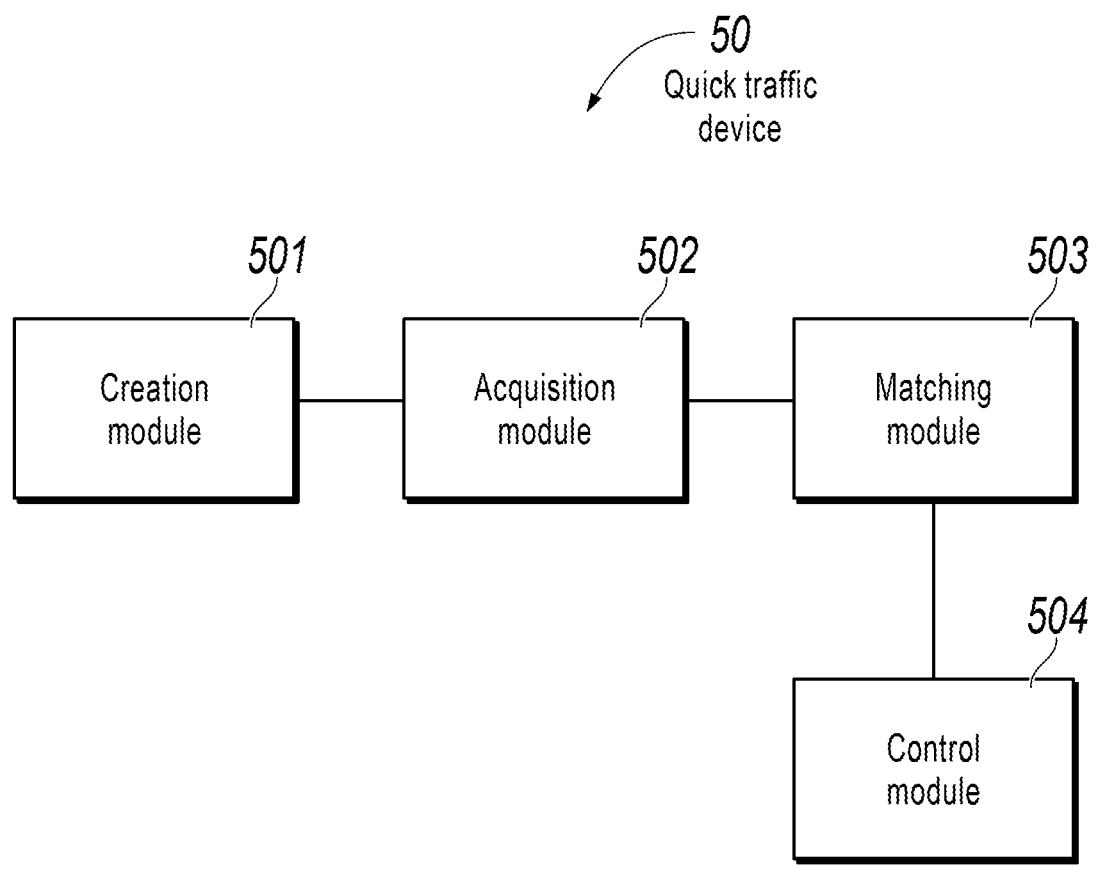
FIG. 5 is a logical block diagram illustrating a traffic detection device, according to an implementation of the present specification.

FIG. 5 is a block diagram illustrating a traffic detection device, according to an example implementation of the present specification.

Referring to FIG. 5, the traffic detection device 50 can be applied to the electronic device shown in FIG. 4, and includes a creation module 501, an acquisition module 502, a matching module 503, and a control module 504.

The creation module 501 is configured to perform, by using a wireless access device deployed at a traffic station, short-range wireless communication with a mobile device entering a signal coverage area, detect a commuter whose identity information is associated with the traffic station, and create a dynamic facial sample library based on a facial image sample of the detected commuter.

The acquisition module 502 is configured to obtain a facial image of a commuter collected by a capturing device deployed at the traffic station.

The matching module 503 is configured to match the facial image against facial image samples in the dynamic facial sample library.

The control module 504 is configured to control a gate to allow the commuter to pass if the facial image matches any facial image sample in the dynamic facial sample library.

In the present implementation, the creation module 501 is configured to obtain identity information uploaded by the mobile device and collected, when the wireless access device performs short-range wireless communication with the mobile device entering the signal coverage area; and select the identity information associated with the traffic station from the obtained identity information based on a locally stored mapping relationship between identity information and a traffic station.

In the present implementation, the creation module 501 is further configured to further select identity information collected within a passing period of the target user at the traffic station from the selected identity information associated with the traffic station, and query a facial image sample corresponding to the selected identity information, and create the dynamic facial image sample library based on the queried facial image sample.

In the present implementation, the creation module 501 is further configured to obtain registration information uploaded by a traffic client device, where the registration information includes a traffic station selected by a commuter and identity information of the commuter; and create a mapping relationship between the traffic station selected by the commuter and the identity information of the commuter, and locally store the mapping relationship.

In the present implementation, the creation module 501 is further configured to determine a distance between the mobile device entering the signal coverage area and the gate by using the wireless access device before querying the facial image sample corresponding to the selected identity information; select a target mobile device whose distance from the gate is less than a predetermined threshold and/or a target mobile device whose distance from the gate decreases, based on the determined distance; and further select identity information uploaded by the target mobile device from the selected identity information.

In the present implementation, the passing period is a time period of predetermined duration before the facial image of the target user is captured.

In the present implementation, the identity information of the commuter includes a hardware identifier of a mobile device of the commuter.

In the present implementation, the facial image samples in the dynamic facial sample library are bonded with payment accounts in advance; and the control module 504 is further configured to perform payment deduction from a payment account bonded with the facial image sample, and control the gate to allow the commuter to pass after the deduction is completed, if the facial image matches any facial image sample in the facial sample library.

For an implementation process of functions and roles of the modules in the device, references can be made to an implementation process of the corresponding steps in the previous method. Details are omitted here for simplicity.

Corresponding to the previous method implementation, the present specification further provides an implementation of an electronic device implementation. The electronic device includes a processor and a memory configured to store a machine executable instruction. The processor and the memory are usually connected to each other by using an internal bus. In another possible implementation, the device can further include an external interface, to communicate with another device or component.

In the present implementation, by reading and executing a machine executable instruction stored in the memory and corresponding to traffic detection control logic, the processor is configured to perform, by using a wireless access device deployed at a traffic station, short-range wireless communication with a mobile device entering a signal coverage area, detect a commuter whose identity information is associated with the traffic station, and create a dynamic facial sample library based on a facial image sample of the detected commuter; obtain a facial image of a target user collected by a capturing device deployed at the traffic station; match the facial image against facial image samples in the dynamic facial sample library; and control a gate to allow the target user to pass if the facial image matches any facial image sample in the dynamic facial sample library.

In the present implementation, by reading and executing a machine executable instruction stored in the memory and corresponding to traffic detection control logic, the processor is configured to obtain identity information uploaded by the mobile device and collected when the wireless access device performs short-range wireless communication with the mobile device entering the signal coverage area; and select the identity information associated with the traffic station from the obtained identity information based on a locally stored mapping relationship between identity information and a traffic station.

In the present implementation, by reading and executing a machine executable instruction stored in the memory and corresponding to traffic detection control logic, the processor is configured to further select identity information collected within a passing period of the target user at the traffic station from the selected identity information associated with the traffic station; and query a facial image sample corresponding to the selected identity information, and create the dynamic facial image sample library based on the queried facial image sample.

In the present implementation, by reading and executing a machine executable instruction stored in the memory and corresponding to traffic detection control logic, the processor is configured to obtain registration information uploaded by a traffic client device, where the registration information includes a traffic station selected by a commuter and identity information of the commuter; and create a mapping relationship between the traffic station selected by the commuter and the identity information of the commuter, and locally store the mapping relationship.

In the present implementation, by reading and executing a machine executable instruction stored in the memory and corresponding to traffic detection control logic, the processor is configured to determine a distance between the mobile device entering the signal coverage area and the gate by using the wireless access device before querying the facial image sample corresponding to the selected identity information; select a target mobile device whose distance from the gate is less than a predetermined threshold and/or a target mobile device whose distance from the gate decreases, based on the determined distance; and further select identity information uploaded by the target mobile device from the selected identity information.

In the present implementation, the facial image samples in the dynamic facial sample library are bonded with payment accounts in advance; and by reading and executing a machine executable instruction stored in the memory and corresponding to traffic detection control logic, the processor is configured to: perform payment deduction from a payment account bonded with the facial image sample, and control the gate to allow the commuter to pass after the deduction is completed, if the facial image matches any facial image sample in the facial sample library.

Specific implementations of the present specification are described above. Other implementations are within the scope of the appended claims. In some cases, the actions or steps in the claims can be performed in an order different from that of the implementations and can still achieve the desired result. In addition, the process depicted in the accompanying drawings does not necessarily require a specific order or sequence to achieve the desired result. In some implementations, multitask processing and parallel processing can also be possible or can be advantageous.

The implementations in the present specification are all described in a progressive way. For same or similar parts in the implementations, reference can be made to these implementations. Each implementation focuses on a difference from other implementations. Device, system, electronic device, and non-volatile computer storage medium implementations are similar to a method implementation, and therefore are described briefly. For related parts, reference can be made to descriptions in the method implementation Based on the previous descriptions of the implementations, a person skilled in the art can clearly understand that implementations of the present specification can be implemented by software in addition to necessary hardware. Based on such an understanding, the technical solutions in the implementations of the present specification essentially or the part contributing to the existing technology can be implemented in a form of a software product. The computer software product can be stored in a storage medium, such as a ROM/RAM, a hard disk, or an optical disc, and includes several instructions for instructing a computer device (which can be a personal computer, a server, or a network device) to perform the method described in the implementations or some parts of the implementations of the present specification.

The system, device, module, or unit described in the previous implementations can be specifically implemented by a computer chip or an entity, or implemented by a product having a certain function. A typical implementation device is a computer. The computer can be a personal computer, a laptop computer, a cellular phone, a camera phone, an intelligent telephone, a personal digital assistant, a media player, a navigation device, an e-mail receiving and sending device, a game console, a tablet computer, a wearable device, or a combination of any several devices in these devices.

The implementations in the present specification are all described in a progressive way. For same or similar parts in the implementations, reference can be made to these implementations. Each implementation focuses on a difference from other implementations. Especially, a device implementation is similar to a method implementation, and therefore is described briefly. For related parts, reference can be made to par of the descriptions in the method implementation. The device implementations described above are merely an example, and the modules described as separate components may or may not be physically separate. In the implementations of the present specification, functions of modules can be implemented in one or more pieces of software and/or hardware. Some or all the modules can be selected based on an actual requirement to achieve the objectives of the solutions of the implementations. A person of ordinary skill in the art can understand and implement the implementations of the present specification without creative efforts.

The previous descriptions are merely specific implementations of the implementations of the present specification. It is worthwhile to note that a person of ordinary skill in the art can make improvements or modifications without departing from the principle of the implementations of the present specification and the improvements or polishing shall fall within the protection scope of the implementations of the present specification.

Figure 6:
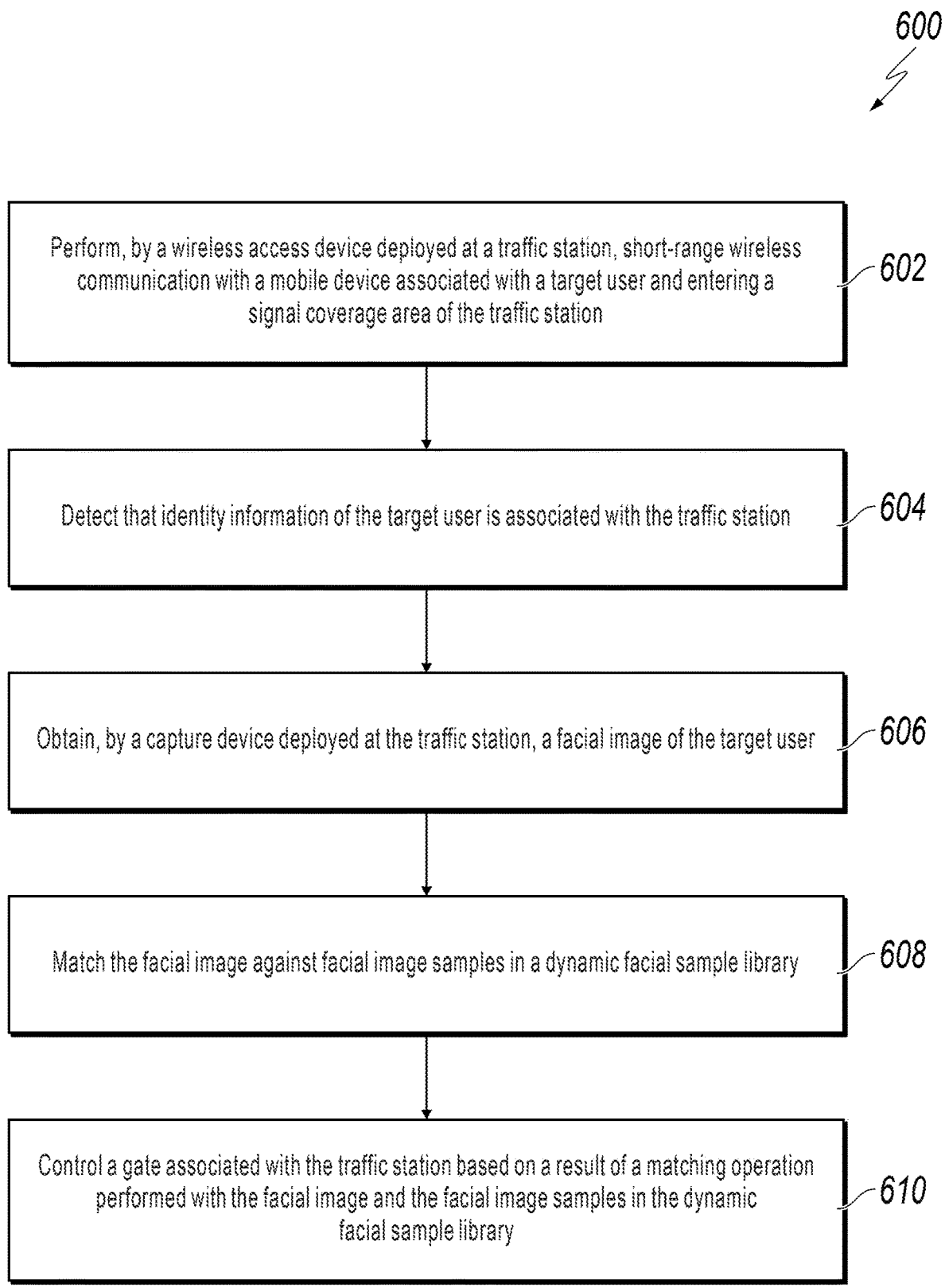
FIG. 6 is a flowchart illustrating an example of a computer-implemented method for performing facial recognition to control whether an individual passes a gate at a traffic station, according to an implementation of the present disclosure.

FIG. 6 is a flowchart illustrating an example of a computer-implemented method 600 for performing facial recognition to control whether an individual passes a gate at a traffic station, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a wireless access device deployed at a traffic station performs short-range wireless communication with a mobile device associated with a target user and entering a signal coverage area of the traffic station. In some implementations, performing, by the wireless access device deployed at the traffic station, short-range wireless communication with the mobile device associated with the target user and entering the signal coverage area includes: 1) obtaining identity information associated with the target user that is uploaded by the mobile device and 2) selecting identity information associated with the traffic station from the identity information based on a locally stored mapping relationship between identity information and the traffic station.

In some implementations: 1) identity information is selected, as selected identity information, from the identity information associated with the traffic station and collected within a passing period of the target user at the traffic station; 2) a prior-obtained facial image sample corresponding to the selected identity information is queried for; and 3) the dynamic facial sample library associated with the target user is generated based on the prior-obtained facial image sample.

In some implementations: 1) registration information uploaded by a traffic client device is obtained, where the registration information comprises the traffic station as selected by the target user and the identity information associated with the target user; 2) a mapping relationship is generated between the traffic station and the identity information associated with the target user; and 3) the mapping relationship is locally stored with the traffic station.

In some implementations, before querying for the prior-obtained facial image sample corresponding to the selected identity information: 1) the wireless access device determines a distance between the mobile device entering the signal coverage area of the traffic station and the gate; 2) a target mobile device whose distance from the gate is less than a predetermined threshold or whose distance from the gate decreases, is selected based on the determined distance; and 3) identity information uploaded by the target mobile device from the selected identity information is selected.

In some implementations, the passing period is a time period of predetermined duration before the facial image of the target user is obtained by the image capture device deployed at the traffic station. From 602, method 600 proceeds to 604.

At 604, an association between identity information of the target user and the traffic station is detected. From 604, method 600 proceeds to 606.

At 606, an image capture device deployed at the traffic station obtains a facial image of the target user and matches the facial image against facial image samples in a dynamic facial sample library. In some implementations: 1) the facial image samples in the dynamic facial sample library are pre-bound with payment accounts; and 2) the gate is controlled based on the result of the matching operation performed with the facial image and the facial image samples in the dynamic facial sample library. If the facial image matches any facial image sample in the dynamic facial sample library, a payment deduction is performed from a particular payment account pre-bound with the facial image sample and the gate is controlled to allow the target user to pass after the payment deduction completes. From 606, method 600 proceeds to 608.

At 608, the facial image is matched against facial image samples in a dynamic facial sample library. From 608, method 600 proceeds to 610.

At 610, a gate associated with the traffic station is controlled based on a result of a matching operation performed with the facial image and the facial image samples in the dynamic facial sample library. After 610, method 600 can stop.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    performing, by a wireless access device deployed at a traffic station, short-range wireless communication with a mobile device associated with a target user and entering a signal coverage area of the traffic station;
    detecting that identity information of the target user is associated with the traffic station;
    obtaining, by an image capture device deployed at the traffic station, a facial image of the target user;
    creating a dynamic facial sample library, wherein the dynamic facial sample library comprises multiple facial samples of multiple users who enter the traffic station within a passing period, wherein the passing period corresponds to a time interval between the target user entering the traffic station and the facial image of the target user being obtained;
    matching the facial image of the target user against the multiple facial samples in the dynamic facial sample library;
    determining that the facial image of the target user matches at least one of the multiple facial samples in the dynamic facial sample library; and
    controlling a gate associated with the traffic station based on determining that the facial image of the target user matches the at least one of the multiple facial samples in the dynamic facial sample library.

2. The computer-implemented method of claim 1, wherein performing, by the wireless access device deployed at the traffic station, short-range wireless communication with the mobile device associated with the target user and entering the signal coverage area comprises:
    obtaining identity information associated with the target user that is uploaded by the mobile device; and
    selecting identity information associated with the traffic station from the identity information based on a locally stored mapping relationship between identity information and the traffic station.

3. The computer-implemented method of claim 2, comprising:
    querying for a prior-obtained facial sample corresponding to the selected identity information; and
    including the prior-obtained facial sample in the dynamic facial sample library.

4. The computer-implemented method of claim 3, comprising, before querying for the prior-obtained facial sample corresponding to the selected identity information:
    determining, by the wireless access device, a distance between the mobile device entering the signal coverage area of the traffic station and the gate;
    selecting a target mobile device whose distance from the gate is less than a predetermined threshold or whose distance from the gate decreases, based on the determined distance; and
    selecting identity information uploaded by the target mobile device from the selected identity information.

5. The computer-implemented method of claim 2, comprising:
    obtaining registration information uploaded by a traffic client device, wherein the registration information comprises the traffic station as selected by the target user and the identity information associated with the target user;
    generating a mapping relationship between the traffic station and the identity information associated with the target user; and
    locally storing the mapping relationship with the traffic station.

6. The computer-implemented method of claim 1, wherein the multiple facial samples in the dynamic facial sample library are pre-bound with payment accounts, and wherein controlling the gate comprises:
    performing payment deduction from a particular payment account pre-bound with a facial sample matching the facial image of the target user; and
    controlling the gate to allow the target user to pass after the payment deduction completes.

7. The computer-implemented method of claim 1, wherein the identity information comprises a hardware identifier of the mobile device.

8. A non-transitory, computer-readable medium storing one or more instructions executable by a computer system to perform operations comprising:
    performing, by a wireless access device deployed at a traffic station, short-range wireless communication with a mobile device associated with a target user and entering a signal coverage area of the traffic station;
    detecting that identity information of the target user is associated with the traffic station;
    obtaining, by an image capture device deployed at the traffic station, a facial image of the target user;
    creating a dynamic facial sample library, wherein the dynamic facial sample library comprises multiple facial samples of multiple users who enter the traffic station within a passing period, wherein the passing period corresponds to a time interval between the target user entering the traffic station and the facial image of the target user being obtained;
    matching the facial image of the target user against the multiple facial samples in the dynamic facial sample library;
    determining that the facial image of the target user matches at least one of the multiple facial samples in the dynamic facial sample library; and controlling a gate associated with the traffic station based on determining that the facial image of the target user matches the at least one of the multiple facial samples in the dynamic facial sample library.

9. The non-transitory, computer-readable medium of claim 8, wherein performing, by the wireless access device deployed at the traffic station, short-range wireless communication with the mobile device associated with the target user and entering the signal coverage area comprises:
   obtaining identity information associated with the target user that is uploaded by the mobile device; and
   selecting identity information associated with the traffic station from the identity information based on a locally stored mapping relationship between identity information and the traffic station.

10. The non-transitory, computer-readable medium of claim 9, wherein the operations comprise:
    querying for a prior-obtained facial sample corresponding to the selected identity information; and
    including the prior-obtained facial sample in the dynamic facial sample library.

11. The non-transitory, computer-readable medium of claim 10, wherein the operations comprise, before querying for the prior-obtained facial sample corresponding to the selected identity information:
    determining, by the wireless access device, a distance between the mobile device entering the signal coverage area of the traffic station and the gate;
    selecting a target mobile device whose distance from the gate is less than a predetermined threshold or whose distance from the gate decreases, based on the determined distance; and
    selecting identity information uploaded by the target mobile device from the selected identity information.

12. The non-transitory, computer-readable medium of claim 9, wherein the operations comprise:
    obtaining registration information uploaded by a traffic client device, wherein the registration information comprises the traffic station as selected by the target user and the identity information associated with the target user;
    generating a mapping relationship between the traffic station and the identity information associated with the target user; and
    locally storing the mapping relationship with the traffic station.

13. The non-transitory, computer-readable medium of claim 8, wherein the multiple facial samples in the dynamic facial sample library are pre-bound with payment accounts, and wherein controlling the gate comprises:
    performing payment deduction from a particular payment account pre-bound with a facial sample matching the facial image of the target user; and
    controlling the gate to allow the target user to pass after the payment deduction completes.

14. The non-transitory, computer-readable medium of claim 8, wherein the identity information comprises a hardware identifier of the mobile device.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
      performing, by a wireless access device deployed at a traffic station, short-range wireless communication with a mobile device associated with a target user and entering a signal coverage area of the traffic station;
      detecting that identity information of the target user is associated with the traffic station;
      obtaining, by an image capture device deployed at the traffic station, a facial image of the target user;
      creating a dynamic facial sample library, wherein the dynamic facial sample library comprises multiple facial samples of multiple users who enter the traffic station within a passing period, wherein the passing period corresponds to a time interval between the target user entering the traffic station and the facial image of the target user being obtained;
      matching the facial image of the target user against the multiple facial samples in the dynamic facial sample library;
      determining that the facial image of the target user matches at least one of the multiple facial samples in the dynamic facial sample library; and
      controlling a gate associated with the traffic station based on determining that the facial image of the target user matches the at least one of the multiple facial samples in the dynamic facial sample library.

16. The computer-implemented system of claim 15, wherein performing, by the wireless access device deployed at the traffic station, short-range wireless communication with the mobile device associated with the target user and entering the signal coverage area comprises:
    obtaining identity information associated with the target user that is uploaded by the mobile device; and
    selecting identity information associated with the traffic station from the identity information based on a locally stored mapping relationship between identity information and the traffic station.

17. The computer-implemented system of claim 16, wherein the operations comprise:
    querying for a prior-obtained facial sample corresponding to the selected identity information; and
    including the prior-obtained facial sample in the dynamic facial sample library.

18. The computer-implemented system of claim 17, wherein the operations comprise, before querying for the prior-obtained facial sample corresponding to the selected identity information:
    determining, by the wireless access device, a distance between the mobile device entering the signal coverage area of the traffic station and the gate;
    selecting a target mobile device whose distance from the gate is less than a predetermined threshold or whose distance from the gate decreases, based on the determined distance; and
    selecting identity information uploaded by the target mobile device from the selected identity information.

19. The computer-implemented system of claim 16, wherein the operations comprise:
    obtaining registration information uploaded by a traffic client device, wherein the registration information comprises the traffic station as selected by the target user and the identity information associated with the target user;
    generating a mapping relationship between the traffic station and the identity information associated with the target user; and locally storing the mapping relationship with the traffic station.

20. The computer-implemented system of claim 15, wherein the multiple facial samples in the dynamic facial sample library are pre-bound with payment accounts, and wherein controlling the gate comprises:
  performing payment deduction from a particular payment account pre-bound with a facial sample matching the facial image of the target user; and
  controlling the gate to allow the target user to pass after the payment deduction completes.

\* \* \* \* \*